(12) United States Patent
Cifers, III et al.

(10) Patent No.: US 12,434,798 B1
(45) Date of Patent: Oct. 7, 2025

(54) ACCESSORY MOUNT

(71) Applicant: YakAttack LLC, Farmville, VA (US)

(72) Inventors: Luther Cifers, III, Farmville, VA (US);
Joey Martin Pruitt, Appomattox, VA (US); John Aubrey Hipsher, Farmville, VA (US)

(73) Assignee: YakAttack LLC, Farmville, VA (US)

( * ) Notice: Subject to any disclaimer, the term of this patent is extended or adjusted under 35 U.S.C. 154(b) by 0 days.

(21) Appl. No.: 17/720,613

(22) Filed: Apr. 14, 2022

(51) Int. Cl.
*B63B 34/26* (2020.01)

(52) U.S. Cl.
CPC .................................. *B63B 34/26* (2020.02)

(58) Field of Classification Search
CPC ....................................................... B63B 34/26
USPC ......................................................... 224/406
See application file for complete search history.

(56) References Cited

U.S. PATENT DOCUMENTS

| | | | | |
|---|---|---|---|---|
| 573,502 | A * | 12/1896 | Cahill ......................... | B62J 7/04 224/455 |
| 4,823,673 | A * | 4/1989 | Downing ................ | F41A 23/34 89/37.04 |
| 5,697,181 | A * | 12/1997 | Savant ..................... | B62J 11/00 224/420 |
| 6,484,913 | B1 * | 11/2002 | Hancock ................. | B62J 11/00 224/446 |
| 6,578,309 | B1 * | 6/2003 | Frisce ..................... | F41A 23/06 89/37.04 |
| 6,588,637 | B2 * | 7/2003 | Gates ....................... | B60R 7/14 224/558 |
| 6,695,183 | B2 * | 2/2004 | Hancock ................. | B60R 11/00 224/558 |
| 6,843,395 | B1 * | 1/2005 | Martin ..................... | B60R 7/14 224/570 |
| 7,017,788 | B2 * | 3/2006 | Trambley ................. | B60R 9/04 248/300 |
| 7,290,690 | B2 * | 11/2007 | Hancock ............... | B63B 25/002 224/406 |
| 7,980,798 | B1 * | 7/2011 | Kuehn ................. | B60P 7/0815 410/104 |

(Continued)

*Primary Examiner* — Peter N Helvey
(74) *Attorney, Agent, or Firm* — Thedford I. Hitaffer; Hitaffer & Hitaffer, PLLC

(57) ABSTRACT

A mount comprise multiple mounting locations for mounting various accessories in relation to a mounting surface. The mount comprises a proximate mounting location configured to be mounted in relation to the mounting surface, and multiple distal mounting locations for mounting accessories in a spaced relation to the proximate mounting location. An accessory may be mounted at the proximate mounting location, while at the same time, mounting the mount to the mounting surface. The distal mounting location may be spaced apart and elevated in relation to the proximate mounting location so that a user may reach between and below the distal mounting locations. The mount may also be configured to be mounted in a cantilevered fashion in relation to the mounting surface. The mount may be provided with an interlocking feature or surface, which may be in the form of a ratcheting or indexable feature, which may permit angular adjustment of the mount at discrete positions. The mount may support a tether, which may be stowed in closed out of the way in proximity to the mount, and which may be deployed to hold an accessory in relation to an accessory mount.

22 Claims, 11 Drawing Sheets

(56) References Cited

U.S. PATENT DOCUMENTS

| | | | | |
|---|---|---|---|---|
| 8,534,519 B2* | 9/2013 | Hancock | ................... | B62J 7/08 |
| | | | | 224/558 |
| 8,616,505 B2* | 12/2013 | Gates | .................. | F16M 11/041 |
| | | | | 248/62 |
| 8,651,289 B2* | 2/2014 | Diaz, Jr. | ................ | A01K 97/08 |
| | | | | 206/315.11 |
| 8,708,205 B2* | 4/2014 | Wotton | ................... | B62J 11/00 |
| | | | | 224/451 |
| 9,180,925 B2* | 11/2015 | Carnevali | ................ | B62J 29/00 |
| 9,623,787 B2* | 4/2017 | Sterling | ................ | B60P 7/0815 |
| 10,378,690 B2* | 8/2019 | Carnevali | ............ | F16M 11/425 |
| 10,429,147 B2* | 10/2019 | Williams | ............ | F16M 13/022 |
| 10,982,731 B2* | 4/2021 | Hancock | ............. | F16M 13/022 |
| 11,608,011 B2* | 3/2023 | Winkler | ................. | B60R 11/06 |
| 11,801,793 B1* | 10/2023 | Gates | ................. | F16M 11/2092 |
| 2003/0042282 A1* | 3/2003 | Gates | ........................ | B60R 7/14 |
| | | | | 224/558 |
| 2004/0020954 A1* | 2/2004 | Gates | ..................... | B60R 9/048 |
| | | | | 224/442 |
| 2005/0092798 A1* | 5/2005 | Borgman | ................. | B62J 11/05 |
| | | | | 224/420 |
| 2005/0092876 A1* | 5/2005 | Carnevali | ............ | F16M 13/022 |
| | | | | 248/160 |
| 2007/0246633 A1* | 10/2007 | Carnevali | ............. | F16M 11/28 |
| | | | | 248/544 |
| 2008/0115344 A1* | 5/2008 | Carnevali | ............... | B60R 11/02 |
| | | | | 29/428 |
| 2012/0037579 A1* | 2/2012 | Muldoon | ................ | F41A 23/18 |
| | | | | 211/64 |
| 2016/0297503 A1* | 10/2016 | Smit | ....................... | C10L 3/106 |
| 2020/0093111 A1* | 3/2020 | Fryar | ..................... | A01K 97/10 |
| 2020/0283110 A1* | 9/2020 | Bergeron | ............... | B63B 1/121 |

* cited by examiner

ACCESSORY MOUNT

BACKGROUND OF THE INVENTION

This invention relates in general to supports for positioning apparatus or articles, or means for steadying apparatus or articles, and more particularly, for supporting or attaching apparatus or articles on or in relation to an object, and most particularly, for supporting or attaching recreational fishing accessories to maritime vessels, such as kayaks and the like.

Mounting arrangements for mounting accessories, such as, cameras, rod holders, fish finders, to vessels, such as kayaks and the like, are well-known.

A mounting arrangement may be directly mounted to a vessel, or indirectly mounted, such as, via a slotted track, which may be mounted to the vessel, and to which accessories may be, in turn, mounted. Mounting accessories to a slotted track may provide for, or result in, a more versatile mounting arrangement by virtue that the accessories may be adjustable, for example, linearly, along the slotted track.

Accessories may be mounted in spaced relation to the vessel or slotted track by a mounting arrangement, which may include some vertical support to vertically offset the accessory from the vessel or slotted track, an articulating member, such as a hinge joint, which permits movement of the accessory with one degree of freedom, or a ball joint, which permits movement of the accessory with three degrees of freedom, and/or an extension arm to offset the accessory laterally, crosswise or transversely in relation to the vessel or slotted track.

Kayaks and similar vessels are relatively small, providing space for most often a single occupant, and sometimes for two occupants. When used in certain recreational sports, like fishing, kayaks may be equipped or retrofit with a plethora of accessories, including cup holders, rod holders, cameras, fish finders, cleats and tie downs, tackle boxes and creates, visibility flags and lights, push poles, paddle holders, and auxiliary or trolling motors. This can occupy a lot of limited mounting space.

What is needed is a versatile mount, which can be offset beyond the boundaries of the vessel, and provide multiple mounting locations for various accessories, while requiring only a single mounting point in relation to the vessel.

SUMMARY OF THE INVENTION

This invention relates to a mount that comprises multiple mounting locations for mounting various accessories in relation to a mounting surface, such as a maritime vessel, such as a kayak and the like. The mount comprises a first or proximate mounting location configured to be mounted in relation to the mounting surface, and multiple other distal mounting locations for mounting accessories in a spaced relation to the proximate mounting location. An accessory may be mounted at the proximate mounting location, while at the same time, mounting the mount to the mounting surface. The distal mounting location may be spaced apart and elevated in relation to the proximate mounting location so that a user may reach between and below the distal mounting locations. The mount may also be configured to be mounted in a cantilevered fashion in relation to the mounting surface. The mount may be provided with an interlocking feature or surface, which may be in the form of a ratcheting or indexable feature, which may permit angular adjustment of the mount at discrete positions. The mount may support a tether, which may be stowed in closed out of the way in proximity to the mount, and which may be deployed to hold an accessory in relation to an accessory mount.

Various advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
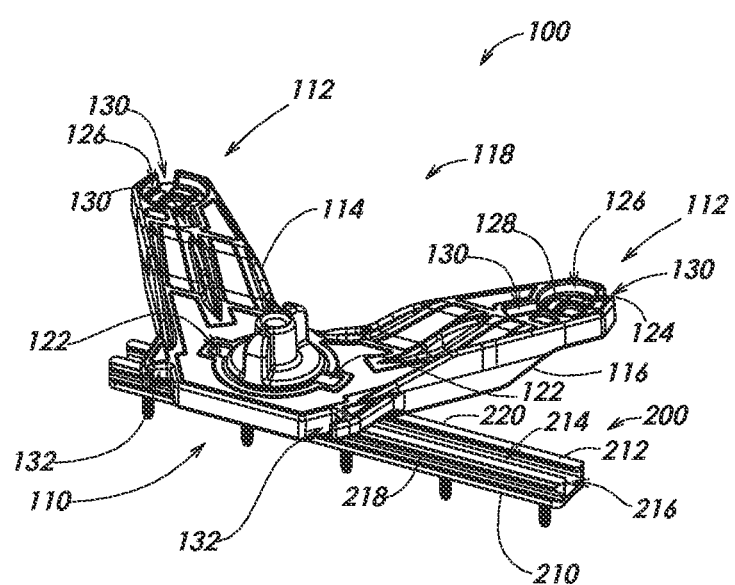
FIG. 1 is an environmental top perspective view of mount for mounting or supporting an accessory or accessory mount in relation to a mounting or supporting surface according to an exemplary embodiment of the invention.

Referring now to the drawings, there is illustrated in FIG. 1 a mount 100 that comprises multiple mounting locations for mounting or supporting various accessories or accessory mounts in relation to a mounting or supporting surface, such as a maritime vessel, such as a kayak and the like. The mount 100 comprises a proximate mounting location 110 configured to be mounted in relation to the mounting surface, and one or more distal mounting locations 112 for mounting accessories or accessory mounts in a spaced relation to the proximate mounting location 110. Accessories or accessory mounts may also be mounted to the proximate mounting location 110, while at the same time, using the same hardware, mounting the mount 100 to the mounting or supporting surface. Consequently, the mount 100 is a single mount that provides a plurality of mounting locations, adding to the utility and versatility of the mount 100.

The illustrated mount 100 is triangular or V-shaped, having plural legs, including at least a first leg 114 and a second leg 116, which may extend from the same or a similar point of origin (e.g., at or near the proximate mounting location 110) in directions so as to diverge and thus be angularly spaced apart, so that the distal mounting locations 112 are spaced apart from one another. It should be noted that an open space, generally at 118 when viewing FIG. 1, is provide between the legs 114, 116 and between the proximate mounting location 110 and the distal mounting locations 112, for example, to permit the passage a user's hand therethrough. Although a triangular or V-shape is shown, it should be appreciated that the mount 100 may be in the form of some other shape, such as a C-shape, a U-shape, a H-shape, a X-shape, or some other suitable shape that accommodates spaced apart mounting locations 110, 112 with an open space 118 to permit passage of a user's hand.

It should be appreciated that the mount 100 may be mounted to the mounting surface via a track 200, which may be in the form of an elongated or longitudinally extending slotted track having a bottom or a lower surface 210 configured to be engageable with the mounting surface, a top or an upper surface 212 configured to be engageable with the mount 100 and/or an accessory or accessory mount, wherein the lower and upper surfaces 210, 212 are opposingly opposed, or otherwise spaced apart and face opposing directions. An elongated or longitudinally extending slot 214 is provided in or through the upper surface 212 and communicates with an elongated or longitudinally extending channel 216 bounded by or between the lower and upper surfaces 210, 212 and opposing sides 218, 220. The track 200 may be mounted to a mounting surface by use of fasteners, which may pass through holes 222 (shown in FIGS. 7 and 8) in the bottom of the track 200, or may be mounted in some other suitable manner, such as by being integrally mounted in relation to the mounting surface and may be embedded or flush mounted in relation to the mounting surface. Examples of suitable tracks are disclosed in U.S. Pat. No. 9,761,060, issued Jun. 6, 2017, U.S. Pat. No. 9,828,073, issued on Nov. 28, 2017, U.S. Pat. No. 9,879,819, issued Jan. 30, 2018, and U.S. Pat. No. 10,435,117, issued Oct. 8, 2019, the disclosures of which is incorporated herein by reference in their entirety.

Figure 2:
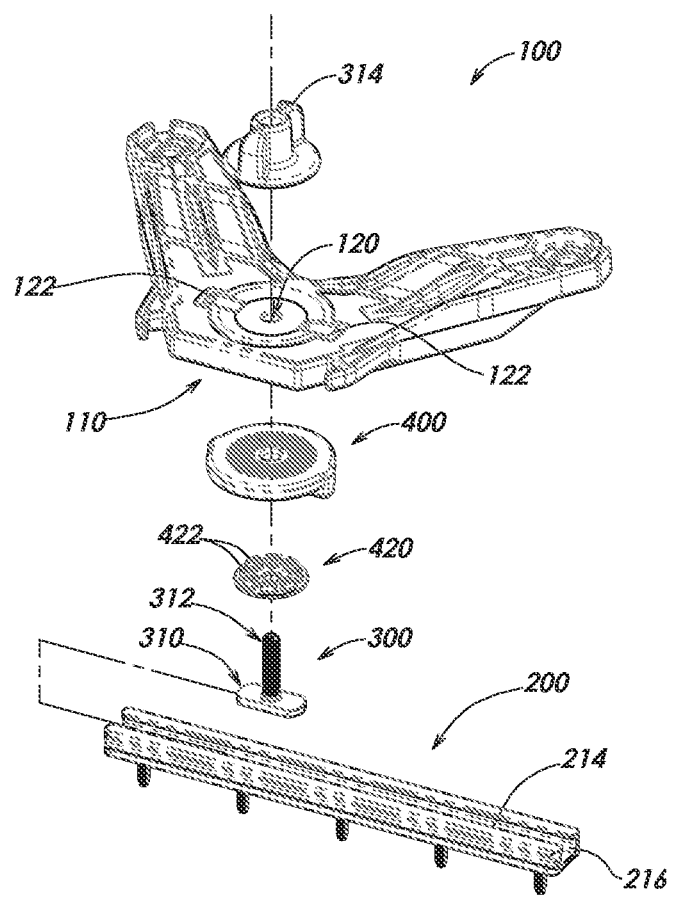
FIG. 2 is an exploded environmental top perspective view of the mount shown in FIG. 1.

As shown in FIG. 2, the mount 100 may be mounted in relation to the track 200 in any suitable manner, including, for example, with a T-bolt 300, which may include a head 310 that may be captured for movement in a longitudinal direction in relation to the channel 216 and a threaded shaft or stud 312 that may pass through the slot 214. An example of a T-bolt is disclosed in U.S. Pat. No. 9,863,576, issued Jan. 9, 2012, the disclosure of which is incorporated herein by reference in its entirety. The threaded stud may pass through a hole 120 at or proximate to the proximate mounting location 110 of the mount 100 and thread into a fastener or retainer, such as the flanged wingnut fastener 314. The wingnut 314 may be formed of metal or a polymer and be provided with a threaded boss, such as a metal threaded boss, for engagement with the threaded stud 312.

It should be appreciated that the mount 100 may be held in a fixed angular relation to the track 200, such as by an interlocking feature extending from, presented by, or supported in relation to the bottom of the mount 100 that cooperates with the track 200. For example, the bottom of the mount 100 may be comprised of one or more tabs or another suitable feature or features (not shown) that may extend into the slot 214. Moreover, the top of the track 200 may comprise a pocket or pockets (not shown) along or proximate the opposing sides 218, 220 engageable with the tabs, which may accommodate mounting of the mount 100 at discrete positions along the tract 200. An example of such pockets is disclosed in U.S. Pat. No. 10,900,607, issued Jan. 26, 2021, the disclosure of which is incorporated herein by reference in its entirety.

Figure 9:
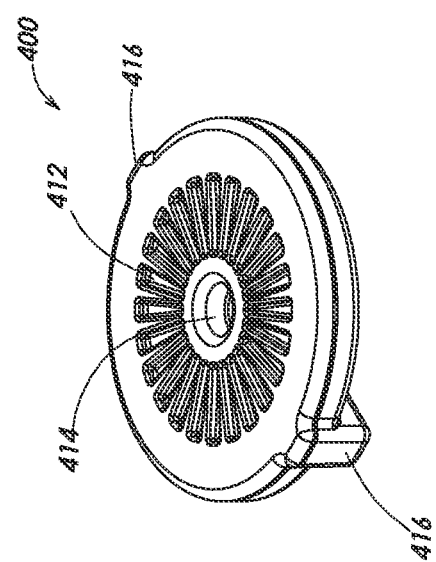
FIG. 9 is an enlarged scale top perspective view of an exemplary interlocking element for use with the mount.

Further, it should be appreciated that one or more protrusions 136 (shown in FIG. 7) may extend from the bottom of the mount 100 in a radial direction. A plurality of such protrusions 136 may be arranged annularly about or in relation to the hole 120 at or proximate to the proximate mounting location 110 of the mount 100. A separate or auxiliary fastening or interlocking adapter or element 400 (shown in FIG. 9) may comprise one or more recesses 412 in a top or upper surface thereof that may extend radially from a hole 414 passing therethrough and be arranged annularly about or in relation to the hole 414. The recesses 412 may be matingly engageable with the protrusions 136 extending from the bottom of the mount 100 in any one of a plurality of angular positions in relation to the bottom of the mount 100. It should be appreciated that the protrusions 136 and recesses 412 may provide a ratcheting and indexable connection between the mount 100 and the interlocking element 400. The interlocking element 400 may also include one or more tabs or other suitable keying features 416 extending from a bottom or lower surface thereof, which may be engageable with the slot 214 in the upper surface 212 of the track 200. This arrangement or configuration allows the mount 100 to be mounted along the track 200 and adjust to a fixed position in relation to the track 200. Additionally, a bottom or lower surface of the interlocking element 400 may be provided with one or more recesses 418 (shown in FIG. 7), which may be bounded or defined by or between spokes, which may extend radially in relation to the hole 414 passing therethrough. The recesses 418 may cooperate with protrusions 422 (shown in FIG. 2) extending upward from an upper surface of a washer 420 (shown in FIG. 2). The washer 420 may be interposed between the upper surface 212 of the track 200 and the bottom of the interlocking member 400. The washer 420 may be formed of an elastomer or other suitable material to aid in frictional interaction between the track 200 (or other suitable mounting surface, such as a surface of a vessel) and the interlocking element 400. It should be appreciated the bottom of the mount 100 may be provided with recesses similar to the recesses 418 in the bottom or lower surface of the interlocking element 400 to cooperate directly with the protrusions 422 extending from the washer 420, so that the washer 420 may be interposed directly between the upper surface 212 of the track 200 and the bottom of the mount 100. It should be appreciated that the washer 420 may make frictional contact with the track 200 to prevent or limit the interlocking member 400 or the mount 100 from slipping in relation to the track 200. An example of such as a washer is described in U.S. Pat. No. 11,079,064, issued Aug. 3, 2021, the disclosure of which is incorporated herein by reference in its entirety.

The mount 100 may further comprise a slot or slots 122 (shown in FIG. 1), which may extend in opposing directions in relation to the hole 120 passing through the proximate mounting location 110 of the mount 100, as shown in FIG. 2. It should be appreciated that one continuous slot 122 may be provided in lieu of or in addition to the hole 120 passing therethrough. Or, opposing slots 120 (instead of a single slot) may extend radially in relation to opposing sides of the hole 120 passing therethrough, as shown. The slot or slots 122 may simulate the slot of a track, or some portion thereof, for engagement with a tab or tabs, or similar key structure, of an accessory or an accessory mount, or the tabs 416 of an interlocking element, like the interlocking element 400 described above, the recesses 412 of which may be matingly engageable with protrusions extending from an accessory or an accessory mount. For example, the slot or slots 122 may be engageable with an accessory mount, such as the accessory mount disclosed in U.S. Pat. No. 11,079,064, issued Aug. 3, 2021, the disclosure of which is incorporated herein by reference in its entirety. The slot or slots 122 are configured to hold an accessory or an accessory mount in a fixed angular position in relation to the proximate mounting location 110, while at the same time, the mount 100 is mounted in relation to a mounting surface (e.g., a vessel or a slotted track). That is to say, accessories or accessory mounts may be mounted in relation to the mount 100 at the proximate mounting location 110, while at the same time, the mount 100 is mounted in relation to a mounting surface, as will become more apparent in the description that follows.

Figure 3:
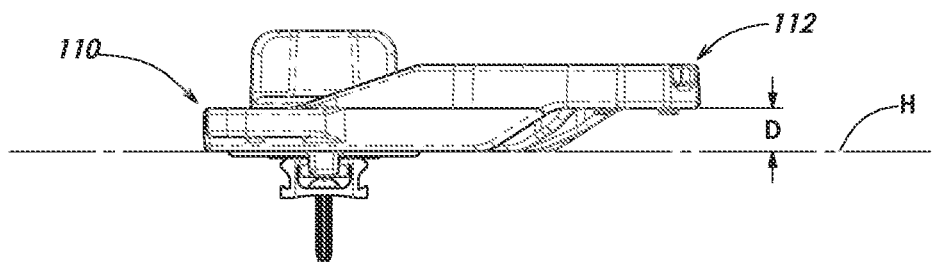
FIG. 3 is an enlarged scale environmental side elevational view of the mount shown in FIG. 1.
Figure 5:
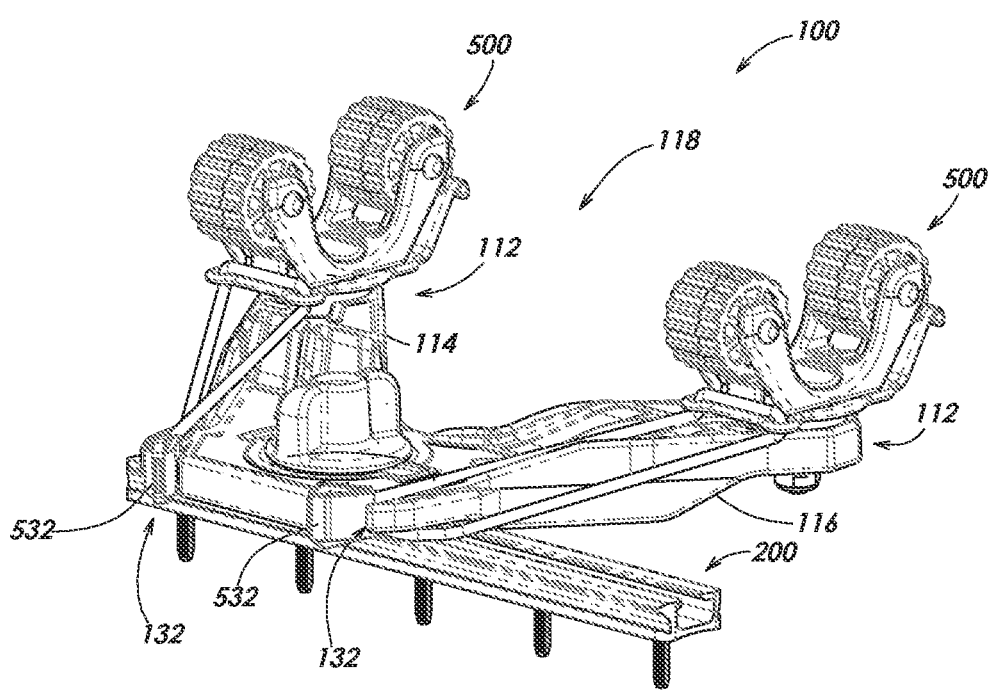
FIG. 5 is an enlarged scale environmental top perspective view of the mount shown in FIG. 1 with accessory mounts mounted or supported in relation to a distal mounting location.
Figure 10:
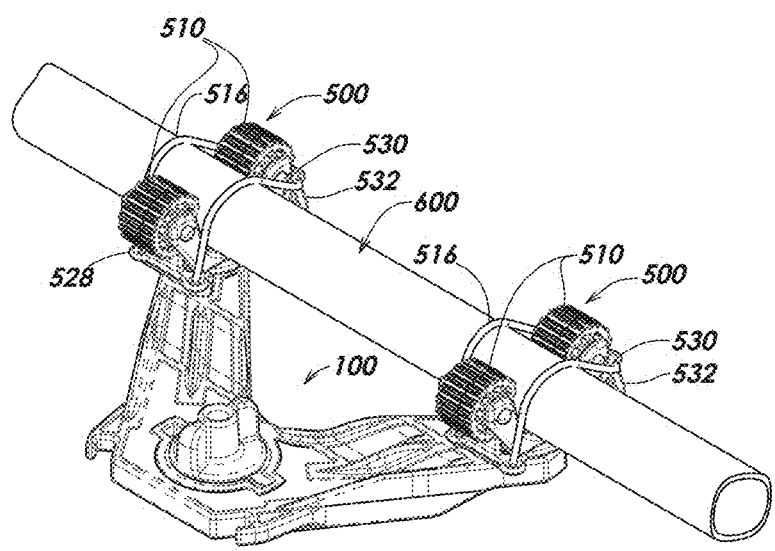
FIG. 10 is an environmental perspective view of the mount shown in FIG. 5 with the track omitted and tethers supporting an elongated accessory in relation to the accessory mount.
Figure 11:
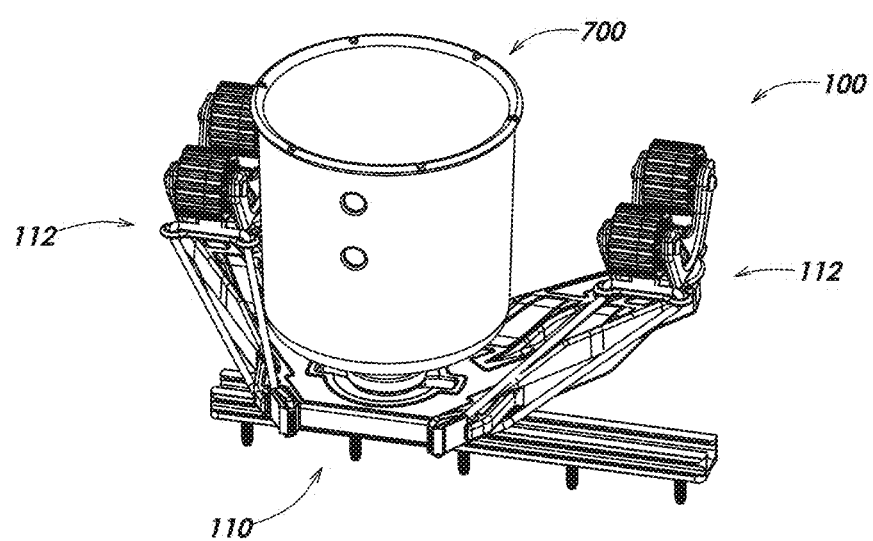
FIG. 11 is an environmental perspective view of the mount shown in FIG. 5 showing the slotted mounting track and an accessory mounted at a proximate mounting location.

It should be appreciated that the legs 114, 116 may not only be spaced apart or diverge, for example, in a horizontal direction, but the distal mounting locations 112 also may each be offset in a vertical direction, for example, in relation to a horizontal plane H, as shown in FIG. 3, particularly in relation to the proximate mounting location 110. This results in a change or increase in elevation between the proximate mounting location 110 and the distal mounting locations 112, wherein the proximate mounting location 110 is position above or higher than the distal mounting locations 112 by some vertical distance D, which may promote ease in access to an elongated accessory 600 (such as an oar or a stakeout/push pole, as shown in FIGS. 10 and 11) extending between or from one of the distal mounting locations 112 to the other distal mounting location 112. This may promote ease of access by a user, who may reach in the open space 118 (shown in FIGS. 1 and 5) between the legs 114, 116 and beneath the accessory 600 extending between the distal mounting locations 112, which are raised in elevation in relation to the proximate mounting location 110. To be clear, the legs 114, 116 may be suspended in a cantilevered fashion to raise the distal mounting locations 112 above or at a higher elevation than the proximate mounting location 110, the point at which the mount 100 is mounted in relation to a mounting surface (e.g., a vessel or a slotted track), to provide clearance beneath the distal mounting locations 112 or the accessory 600 supported in relation to the distal mounting locations 112.

The distal mounting locations 112 may comprise a hole 124, as shown in FIG. 1, which may be a through hole for the passage of a portion (e.g., threaded shaft or stud) of the fastener therethrough, or a threaded hole for threadably engaging a threaded fastener. The top or upper surface of the distal mounting locations 112 may comprise a recess 126 for receiving an accessory or an accessory mount, or a portion thereof. The distal mounting locations 112 may comprise an interlocking feature or surface 128, which may be provided in the recess 126, and may be engageable with protrusions extending from or supported in relation to a bottom or lower surface of an accessory or accessory mount. For example, the interlocking feature or surface 128 may be comprised of radially extending protrusions arranged annularly about the hole 124 that may be configured to engage protrusions extending from or supported in relation to a bottom or lower surface of an accessory or an accessory mount. Additionally, or alternatively, the distal mounting locations 112 may be comprised slots 130, which may extend radially in relation to opposing sides of the hole 124 and recess 126. The slots 130 may simulate the slot of a track, or some portion thereof, for engagement with a tab or tabs, or similar key structure, of an accessory or an accessory mount, or the tabs of an interlocking element, like the interlocking element 400 described above, the recesses 412 of which may be matingly engageable with protrusions extending from an accessory or an accessory mount. In this way, tabs may support the interlocking element 400 in a fixed position or against angular movement in relation to the distal mounting locations 112 while the recesses 412 may matingly engage protrusions extending from or supported by an accessory or an accessory mount to prevent or resist angular movement of an accessory or an accessory mount in relation to the interlocking element 400.

The mount 100 may further be comprised of one or more hooks 132, as shown in FIG. 1, or similar features, each of which may be engageable with a tether, or similar structure, the latter of which may function as retainers, as will become apparent in the description that follows. The hooks 132 may be spaced apart from the distal mounting locations 112, and adjacent or proximate the proximate mounting location 110, for example, spaced apart fore and aft, or in relation to opposing sides of the proximate mounting location 110. The hooks 132 may be configured to support the tethers in a stowed position in close proximity (e.g., parallel or generally parallel) to opposing sides of the mount 100, such as in close proximity to the legs 114, 116, so as to be out of the way of a user.

Figure 4:
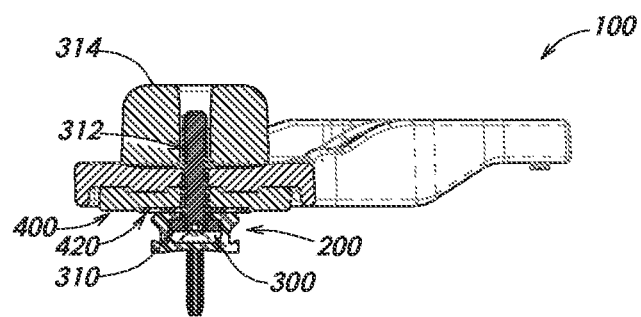
FIG. 4 is an environmental cross-sectional view of the mount shown in FIG. 3.

The mount 100 may be configured to support accessories 500 in the form of paddle holders, as shown in FIGS. 5-8, 10 and 11. Each paddle holder may comprise frictional rollers 510 (shown in FIGS. 10 and 11) with treads supported in spaced relation to one another by support or legs 512 (shown in FIG. 1) that extend upward from a base 514 (shown in FIGS. 6 and 7). The base 514, in turn, may be mounted in fixed relation to the distal mounting locations 112, as shown in the drawings. The paddle holders may be mounted in relation to the distal mounting locations 112, in spaced relation to one another, so as to be arranged in linear alignment with one another to cooperatively support an elongate member 600, such as an oar or a stakeout/push pole (shown in FIGS. 10 and 11). As is clearly shown in the drawings, particularly in FIGS. 3 and 4, the mount 100 may be configured to be cantilevered or offset from the mounting surface (e.g., a vessel or a track 200) when supported in relation to the mounting surface, such as, for example, by the track 200 shown. The mount 100 is configured to provide space between the legs 114, 116 for insertion of a user's hand and may support accessories or accessory mounts (e.g., the paddle holders, or other suitable accessories or accessory mounts) in an elevated posture in relation to the proximate mounting location 110 so that the user's hand may more easily and/or readily reach an elongated accessory supported by and between the distal mounting locations 112.

Figure 6:
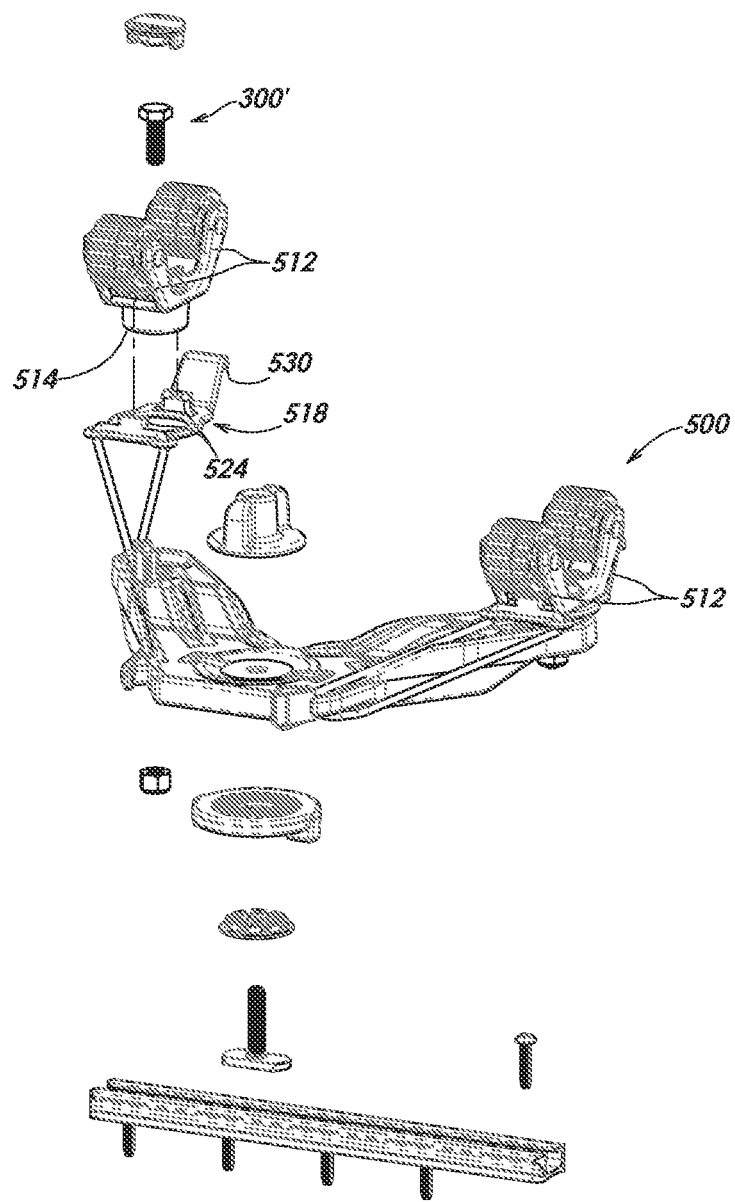
FIG. 6 is a reduced scale environmental top perspective view of the mount shown in FIG. 5 with an accessory mount exploded therefrom.
Figure 7:
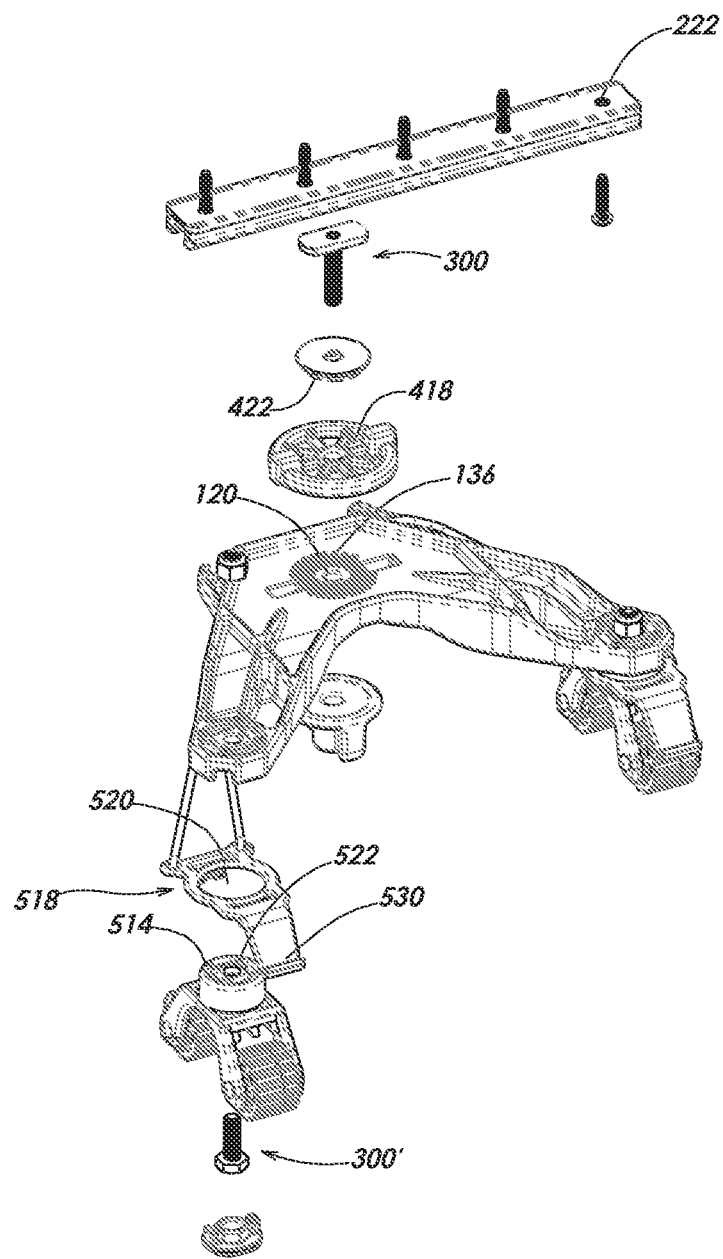
FIG. 7 is an environmental bottom perspective view of the mount shown in FIG. 6.
Figure 8:
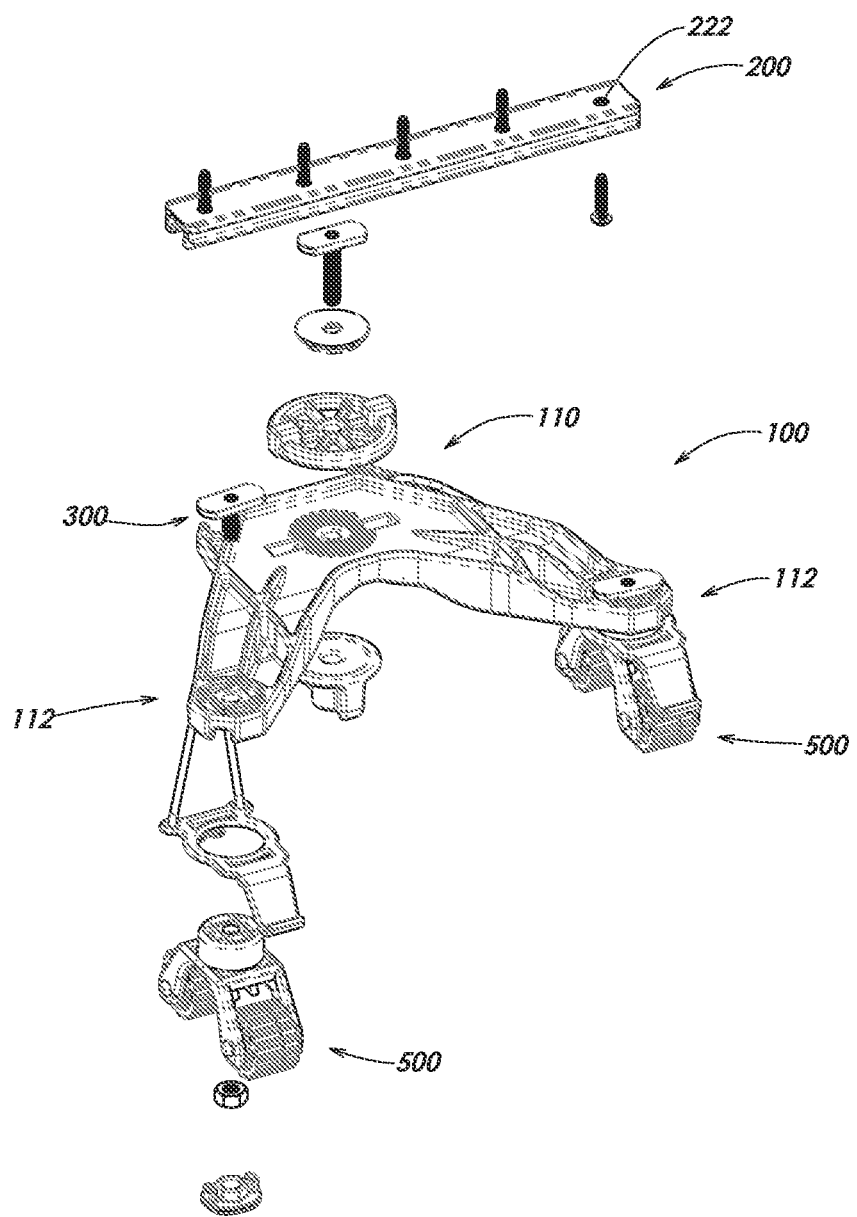
FIG. 8 is an environmental bottom perspective view of the mount shown in FIG. 6 showing an alternate mounting configuration for the accessory mount.

It should be appreciated that the accessories 500 may be supported in relation to the mount 100 in any suitable fashion, such as with the use of a conventional bolt, generally shown at 300' in FIGS. 6 and 7, or a T-bolt, generally shown at 300 in FIG. 8, or in any other suitable manner.

A tether 516, as shown in FIGS. 10 and 11, may be supported in relation to the paddle holders. The tether 516 may be supported in any suitable fashion. For example, in the illustrated embodiment, a retainer 518, as shown in FIGS. 6 and 7, which may be in the form of plate or other suitable structure, may comprise a central portion or region, which may be provided with a hole 520 through which the base 514 may pass and thus engage the distal mounting locations 112. Note that an interlocking feature or surface 522 (e.g., recesses) on the bottom or lower surface of the base 514 (shown in FIG. 7), which may cooperate with the interlocking feature or surface 128 (e.g., protrusions) (shown in FIG. 1) in the recess 126 at the distal mounting locations 112, for example, so as to hold the accessories 500 (e.g., the paddle holders, or other suitable accessories or accessory mounts) in fixed relation to the mount 100. It should be appreciated that the interlocking features or surfaces 128, 522 (e.g., matingly engageable radially extending, annularly arranged recesses and protrusions) may provide a ratcheting and indexable affect or connection between the mount 100 and the accessories or accessory mount. The retainer 518 may also comprise opposingly disposed hooks 524 (shown in FIG. 6), or other suitable structure, which may extend from the retainer 518 and cooperate with the legs 512, or a region or portion of the paddle holders between the legs 512 and the base 514, to hold the retainer 518 in relation of the base 514. The hooks 524 may extend from or be cantilevered in relation to the retainer 518 and may be flexible with a resilient memory, for example, so as to cooperate in a snap fastening manner with the legs 512, or a region or portion of the paddle holders between the legs 512 and the base 514, to hold the retainer 518 in relation of the base 514. Eyelets 528 (shown in FIGS. 10 and 11), or other suitable structure, may be provided at a first end of the retainer 518 (shown in FIGS. 6 and 7) for passage and securement of the tether 516 (shown in FIGS. 10 and 11). A catch 530 (shown in FIGS. 6, 10 and 11) may be provided at a second end of the retainer 518 about which the tether 516 may be secured for holding the elongated accessory 600 (e.g., oar or stakeout/push pole) in relation to the paddle holders to prevent or mitigate the risk that the elongated accessory 600 may inadvertently escape from the paddle holders. Ends of the tether 516 may be captured in a terminal clamp 532 (shown in FIG. 5), or other suitable structure, for securing the ends together, thus forming a tether in the form of a loop. The tether 516, or at least some portion or portions thereof, is preferably formed of an elastic or stretchable material to permit the tether 516 to be stretched about the elongated accessory 600.

Figure 12:
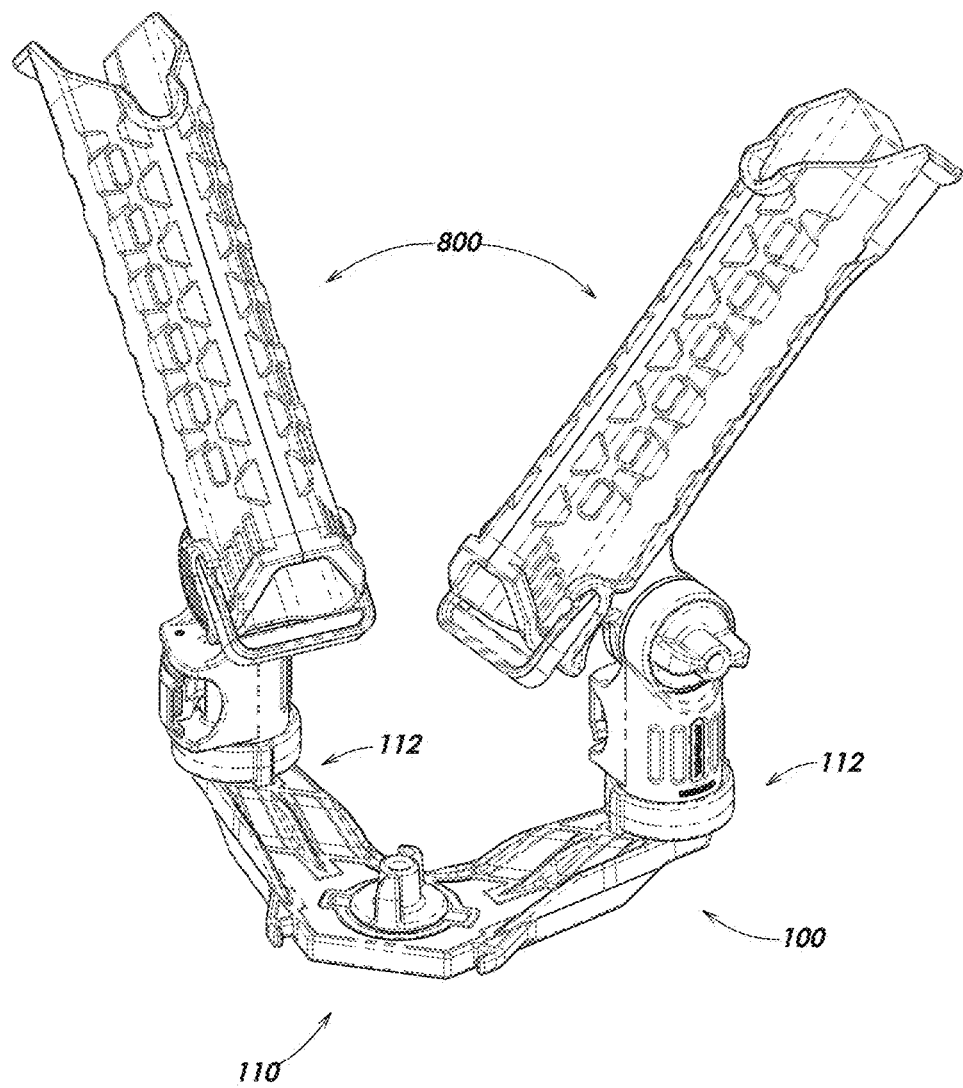
FIG. 12 is an environmental perspective view of the mount shown in FIG. 1 with alternative accessories mounted at the proximate mounting location.

It should be noted that, in addition to providing a mounting location for the mount 100 in relation to a mounting surface (e.g., a vessel or a track 200), the proximate mounting location 110 may provide a mounting location for an accessory or an accessory mount. For example, an accessory or accessory mount 700, such as a cup holder, as shown in FIG. 12, may be mounted at the proximate mounting location 110, while at the same time, mounting the mount 100 to the mounting surface. This can be accomplished using the same hardware or fastener (e.g., T-bolt), for example, by inserting the threaded shaft of a T-bolt through a through hole 120 passing through the proximate mounting location 110, and partially threading the threaded shaft into the accessory or an accessory mount 700. The head of the T-bolt may be inserted into the track 200 (e.g., into the channel 216 of the track 200 with the thread shaft extending upward through the slot 214) (e.g., shown in FIG. 2). Then, the accessory or an accessory mount 700 may be tightened in relation to the T-bolt, thus tightening the accessory or an accessory mount 700, as well as the mount 100, and more particularly, the proximate mounting location 110 of the mount 100, in relation to the track 200.

It should be appreciated that the mount 100 is not intended to be limited in anyway by the accessories or an accessory mounts shown. For example, other accessories or an accessory mounts may be mounted at the distal and proximal mounting locations 110, 112. For example, an accessory or accessory mount 800 in the form of rod holder(s) (i.e., fishing rod holder(s)), may be mounted in relation to the mount 100, for example, in relation to the distal mounting location 112, as shown in FIG. 13, or in relation to the proximate mounting location 110, while at the same time, mounting the mount 100 to a mounting surface. Other accessories or an accessory mounts may include but are not limited to cameras, camera mounts, ball mounts, extension arms, mount bases of all forms, cleats, tie downs, lamp and flag mounts, and fish finders, to name a few.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

PARTS LIST

100 mount
110 proximate mounting location
112 distal mounting locations
114 first leg
116 second leg
118 open space
120 hole
122 slot or slots
124 hole
126 recess
128 interlocking feature or surface
130 slots
132 hooks
136 one or more protrusions
200 track
210 bottom or lower surface
212 top or upper surface
214 elongated or longitudinally extending slot
216 elongated or longitudinally extending channel
218 side
220 side
222 holes
300 T-bolt
300' conventional bolt
310 head
312 threaded shaft or stud
314 flanged fastener or wingnut
400 interlocking adapter or element
412 recesses
414 hole
416 tabs
418 recesses
420 washer
422 protrusions
500 accessories
510 frictional rollers
512 support or legs
514 base
516 tether
518 retainer
520 hole 520
522 interlocking feature or surface
524 hooks
528 eyelets
530 catch
532 terminal clamp
600 elongated accessory
700 accessory or accessory mount
800 accessory or accessory mount H horizontal plane
D vertical distance

What is claimed is:

1. A mount for mounting an accessory or an accessory mount to a mounting surface, the mount comprising:
   a first mounting location configured for mounting the mount in relation to the mounting surface, and
   second mount locations each for mounting an accessory or an accessory mount in spaced relation to the first mounting location and in spaced relation to one another,
   wherein the second mount locations comprise an interlocking feature engageable with a mating interlocking feature supported in relation to a lower surface of the accessory or the accessory mount,
   wherein the second mount locations comprise a recess for receiving at least a portion of the accessory or the accessory mount therein, and the interlocking feature of the second mount locations is provided in the recess,
   wherein second mount locations comprise a slot extending radially beyond opposing sides of the recess for engagement with a key structure of the accessory or the accessory mount configured to hold the accessory or the accessory mount in a fixed angular position in relation to the second mount locations.

2. The mount of claim 1, wherein the first mounting location is disposed in a first plane, and the second mount locations are disposed in a second plane parallel to and higher in elevation than the first plane.

3. The mount of claim 1, wherein the second mount locations are supported in a cantilevered fashion in relation to the first mounting location.

4. The mount of claim 1, wherein the second mount locations comprise a through hole for passage of a portion of a fastener therethrough for mounting the accessory or the accessory mount to the second mount locations.

5. The mount of claim 1, wherein the second mount locations each comprise a recess for receiving at least a portion of the accessory or the accessory mount therein.

6. The mount of claim 1, further comprising a plurality of legs including at least a first leg and a second leg extending from a point of origin at or near the first mounting location so as to diverge and be angularly spaced apart at an angle less than 180 degrees, so that the second mounting locations are spaced apart from one another.

7. The mount of claim 6, wherein the legs diverge to form a V-shape.

8. The mount of claim 6, wherein the legs diverge to provide an open space between the legs and the second mounting locations and between the first mounting location and the second mounting locations to permit passage for a user's hand therebetween.

9. The mount of claim 1, further comprising an interlocking feature beneath the first mounting location configured to permit adjustment of the mount in relation to the mounting surface.

10. The mount of claim 9, wherein the interlocking feature is further configured to permit angular adjustment of the mount at discrete angular positions in relation to the mounting surface.

11. The mount of claim 1, wherein the first mount location comprises a through hole for passage of a portion of a fastener therethrough for mounting the mount to the mounting surface.

12. The mount of claim 11, further comprising interlocking features supported in relation to a lower surface of the mount in a radial direction in relation to the through hole and selectively engageable with mating interlocking features supported in relation to an upper surface of an interlocking element in a radial direction in relation to a through hole passing through the interlocking element for selectively mounting the mount in relation to the mounting surface in one of a plurality of angular positions.

13. The mount of claim 12, wherein the interlocking features and the mating interlocking features form an indexable connection between the mount and the interlocking element.

14. The mount of claim 1, wherein the first mount location is configured for mounting an additional accessory or an additional accessory mount thereto.

15. The mount of claim 14, wherein the first mount location comprises an interlocking feature engageable with a mating interlocking feature supported in relation to a lower surface of the additional accessory or the additional accessory mount mounted thereto.

16. The mount of claim 1, further comprising a first key structure supported in relation to the first mounting location that is engageable with a second key structure supported in relation to an additional accessory or an additional accessory mount configured to hold the additional accessory or the additional accessory mount in a fixed angular position in relation to the first mounting location.

17. The mount of claim 1, further comprising at least one tether configured to be stowed in close proximity to the mount when not in use and deployed to hold an accessory in relation to the accessory mount when in use.

18. The mount of claim 17, further comprising at least one hook engageable with the at least one tether, the at least one hook being spaced from at least one of the second mounting locations and proximate the first mounting location, the hook being configured to support the at least one tether in the stowed position in close proximity to a side of the mount.

19. The mount of claim 18, wherein the accessory is a paddle and the accessory holder is a paddle holder for supporting the paddle and the tether is configured to hold the paddle in relation to the paddle holder when deployed.

20. The mount of claim 1, further comprising a structure formed of a single, one-piece unitary construction, the structure comprising the first mounting location and the second mounting locations.

21. The mount of claim 20, wherein the second mount locations being higher in elevation than the first mounting location to offset the second mount locations in height in relation to the first mounting location to provide clearance beneath the second mount locations.

22. The mount of claim 1, wherein the second mount locations being higher in elevation than the first mounting location to offset the second mount locations in height in relation to the first mounting location to provide clearance beneath the second mount locations.

* * * * *